United States Patent
Matsusue et al.

(10) Patent No.: US 9,520,605 B2
(45) Date of Patent: Dec. 13, 2016

(54) FUEL CELL SYSTEM

(75) Inventors: Masaaki Matsusue, Mishima (JP); Kotaro Ikeda, Susono (JP); Yumi Inoue, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 67 days.

(21) Appl. No.: 14/385,303

(22) PCT Filed: Mar. 15, 2012

(86) PCT No.: PCT/JP2012/056756
§ 371 (c)(1),
(2), (4) Date: Feb. 19, 2015

(87) PCT Pub. No.: WO2013/136494
PCT Pub. Date: Sep. 19, 2013

(65) Prior Publication Data
US 2015/0180070 A1 Jun. 25, 2015

(51) Int. Cl.
*H01M 8/04* (2016.01)
*H01M 8/10* (2016.01)

(52) U.S. Cl.
CPC ....... *H01M 8/04873* (2013.01); *H01M 8/0488* (2013.01); *H01M 8/04223* (2013.01); *H01M 8/04313* (2013.01); *H01M 8/04559* (2013.01); *H01M 8/04604* (2013.01); *H01M 8/1004* (2013.01); *H01M 8/1018* (2013.01);
(Continued)

(58) Field of Classification Search
CPC . H01M 8/04; H01M 8/04082; H01M 8/04753
See application file for complete search history.

(56) References Cited

U.S. PATENT DOCUMENTS

2010/0112401 A1  5/2010  Noto et al.
2010/0266916 A1* 10/2010 Imanishi .......... H01M 8/04268
429/429
(Continued)

FOREIGN PATENT DOCUMENTS

CN   101622748 A   1/2010
JP   2002-313405 A  10/2002
(Continued)

*Primary Examiner* — Stewart Fraser
*Assistant Examiner* — Olatunji Godo
(74) *Attorney, Agent, or Firm* — Andrews Kurth Kenyon LLP

(57) ABSTRACT

A fuel cell system according to the present invention comprises: a fuel cell including a membrane-electrode assembly in which electrodes, each having a catalyst layer, are arranged on both surfaces of a polymer electrolyte membrane; and a control apparatus which controls an output voltage of the fuel cell. If a target voltage of the fuel cell is set so as to be equal to or higher than a catalyst dissolution voltage at which a catalyst in the catalyst layer is dissolved and the amount of an oxide film formed on the catalyst layer is estimated to be less than a first predetermined amount, the control apparatus controls the output voltage of the fuel cell so as to be equal to an oxide film formation voltage, being lower than the catalyst dissolution voltage, until the amount of the oxide film is estimated to be equal to or greater than the first predetermined amount and then controls the output voltage so as to be equal to the target voltage.

5 Claims, 9 Drawing Sheets

(52) U.S. Cl.
CPC .... *H01M 8/04238* (2013.01); *H01M 8/04679* (2013.01); *H01M 2008/1095* (2013.01); *H01M 2250/20* (2013.01); *Y02E 60/50* (2013.01); *Y02T 90/32* (2013.01)

(56) References Cited

U.S. PATENT DOCUMENTS

| | | | |
|---|---|---|---|
| 2012/0225330 A1 | 9/2012 | Umayahara et al. | |
| 2013/0330646 A1 | 12/2013 | Aoki | |
| 2015/0311543 A1* | 10/2015 | Matsusue | H01M 8/04074 429/434 |

FOREIGN PATENT DOCUMENTS

| | | |
|---|---|---|
| JP | 2005-251434 A | 9/2005 |
| JP | 2010-067434 A | 3/2010 |
| JP | 2012-004138 A | 1/2012 |
| JP | 2012-109182 A | 6/2012 |
| JP | 5061594 B | 8/2012 |
| JP | 2012-169197 A | 9/2012 |
| WO | 2008-108451 A | 9/2008 |
| WO | 2012-117937 A1 | 9/2012 |

\* cited by examiner

FUEL CELL SYSTEM

CROSS-REFERENCE TO RELATED APPLICATIONS

This is a national phase application based on the PCT International Patent Application No. PCT/JP2012/056756 filed Mar 15, 2012, the entire contents of which is incorporated herein by reference.

TECHNICAL FIELD

The present invention relates to a fuel cell system comprising a fuel cell that includes a membrane-electrode assembly in which electrodes, each having a catalyst layer, are arranged on both surfaces of a polymer electrolyte membrane.

BACKGROUND ART

A fuel cell stack is a power generation system which oxidizes a fuel through an electrochemical process to thereby directly convert energy released as a result of the oxidation reaction into electric energy. The fuel cell stack has a membrane-electrode assembly in which a polymer electrolyte membrane, which selectively transports hydrogen ions, is sandwiched by a pair of electrodes made of porous materials. Each of the pair of electrodes includes: a catalyst layer that contains, as a main ingredient, carbon powder supporting a platinum-based metal catalyst and contacts with the polymer electrolyte membrane; and a gas diffusion layer formed on a surface of the catalyst layer, the gas diffusion layer having both air permeability and electronic conductivity.

In fuel cell systems of this type, if a cell voltage which has been set based on system-requested power becomes equal to or higher than a predetermined voltage and platinum in the catalyst layer is exposed to a high potential of equal to or higher than a predetermined value, dissolution (ionization) of the platinum might occur and cause degradation of output characteristics. In addition, if the fuel cell continues to be operated within an operation zone where the cell voltage becomes an oxidization voltage, an oxide film might be formed on a surface of the platinum catalyst in the catalyst layer and cause degradation of the output characteristics.

Patent Document 1 discloses a technique for using the oxide film formed on the surface of the platinum catalyst as a protective film for suppressing the dissolution of platinum. Specifically, if a target value of the cell voltage which has been set based on the system-requested power is equal to or higher than a predetermined film dissolution-starting voltage at which the platinum starts dissolving, the cell voltage is held at a predetermined oxide film formation voltage for a predetermined time period in order to form an oxide film on the surface of the platinum catalyst and then the cell voltage is set to the target value.

RELATED ART DOCUMENTS

Patent Documents

Patent Document 1: JP2010-067434 A

DISCLOSURE OF THE INVENTION

Problem to be Solved by the Invention

In Patent Document 1, a judgment is made as to whether or not to form the oxide film on the surface of the platinum catalyst, depending on whether or not the target value of the cell voltage is equal to or higher than the predetermined film dissolution-starting voltage. Thus, when the target value of the cell voltage becomes equal to or higher than the predetermined film dissolution-starting voltage, even if a sufficient oxide film required for suppressing the dissolution of platinum has already been formed on the surface of the platinum catalyst, oxide film formation processing will still be performed unnecessarily, which may lead to the degradation of fuel efficiency.

An object of the present invention is to propose a fuel cell system capable of avoiding unnecessary oxide film formation processing from being performed, and thereby suppressing degradation of fuel efficiency.

Means for Solving the Problem

In order to achieve the object set forth above, a fuel cell system according to the present invention comprises: a fuel cell including a membrane-electrode assembly in which electrodes, each having a catalyst layer, are arranged on both surfaces of a polymer electrolyte membrane; and a control apparatus which controls an output voltage of the fuel cell, wherein, if a target voltage of the fuel cell is set so as to be equal to or higher than a catalyst dissolution voltage at which a catalyst in the catalyst layer is dissolved and the amount of an oxide film formed on the catalyst layer is estimated to be less than a first predetermined amount, the control apparatus controls the output voltage of the fuel cell so as to be equal to an oxide film formation voltage, being lower than the catalyst dissolution voltage, until the amount of the oxide film is estimated to be equal to or greater than the first predetermined amount and then controls the output voltage so as to be equal to the target voltage.

In such configuration, the necessity of the oxide film formation processing for suppressing catalyst dissolution is judged based on the amount of oxide film (the surface area of the oxide film or the ratio of the surface area of the oxide film relative to the surface area of the catalyst layer).

Accordingly, the oxide film formation processing is avoided from being unnecessarily performed when a sufficient amount of oxide film required for suppressing the catalyst dissolution is formed on the catalyst layer.

In the above configuration, while the control apparatus is controlling the output voltage of the fuel cell so as to be equal to the oxide film formation voltage, being lower than the catalyst dissolution voltage, until the amount of the oxide film is estimated to be equal to or greater than the first predetermined amount, the control apparatus may control the output voltage of the fuel cell so that the oxide film formation voltage is held at a constant voltage or so that the oxide film formation voltage increases gradually.

In the above configuration, if the target voltage of the fuel cell is set so as to be equal to or higher than the catalyst dissolution voltage at which the catalyst in the catalyst layer is dissolved and the amount of the oxide film formed on the catalyst layer is estimated to be less than the first predetermined amount at the start of operation of the fuel cell and/or at the start of a scavenging operation for scavenging the inside of the fuel cell, the control apparatus may control the output voltage of the fuel cell so as to be equal to the oxide film formation voltage, being lower than the catalyst dissolution voltage, until the amount of the oxide film is estimated to be equal to or greater than the first predetermined amount and then control the output voltage so as to be equal to the target voltage.

Effect of the Invention

According to the present invention, it is possible to provide a fuel cell system capable of suppressing the degradation of fuel efficiency by avoiding unnecessary oxide film formation processing from being performed.

DESCRIPTION OF REFERENCE NUMERALS

11: fuel cell system, 12: fuel cell, 24a: catalyst layer, 25: membrane-electrode assembly, 60: controller (control apparatus)

BEST MODE FOR CARRYING OUT THE INVENTION

Figure 1:
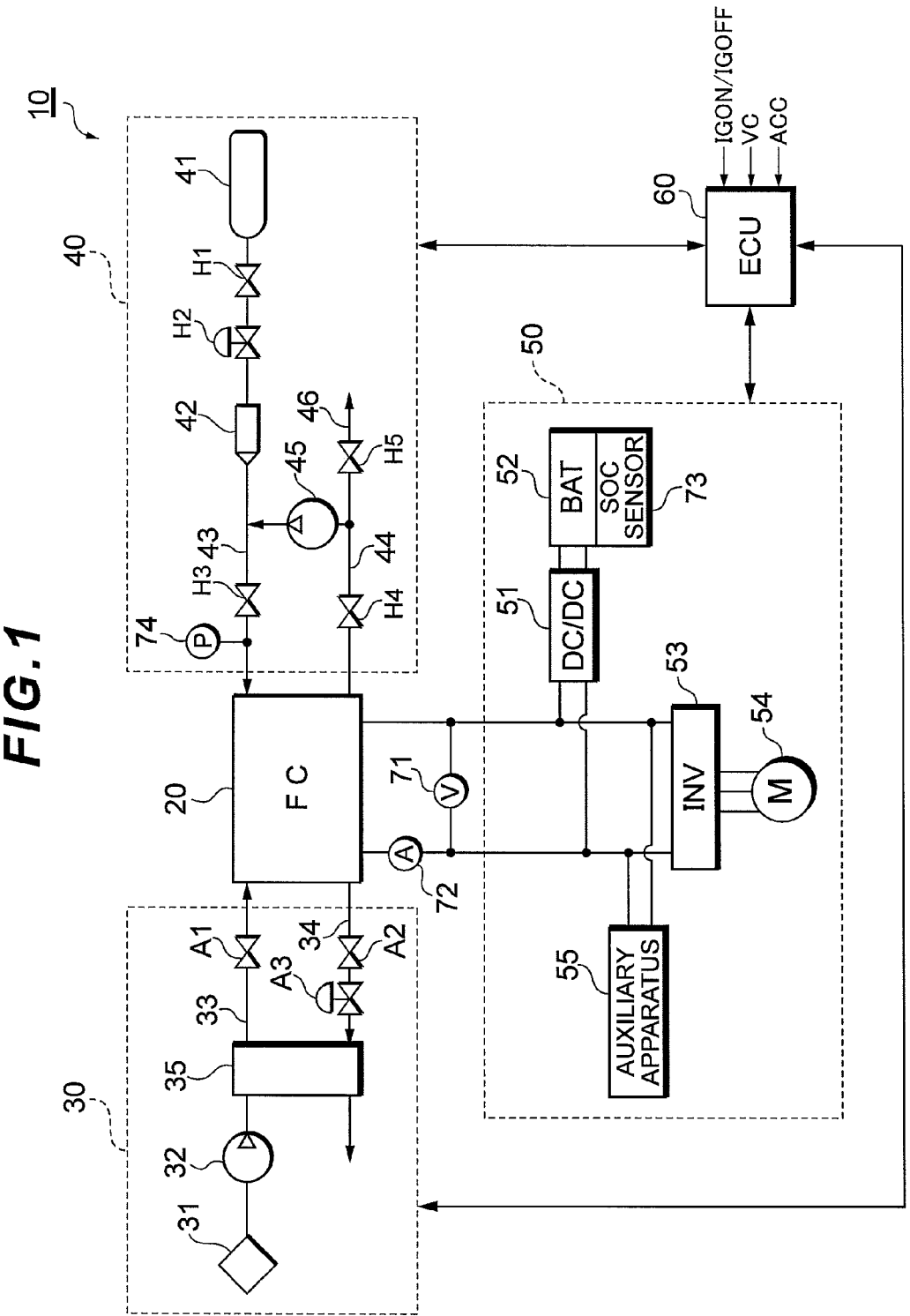
FIG. 1 is a configuration diagram showing a fuel cell system according to an embodiment of the present invention.

Embodiments of the present invention will be described below with reference to the attached drawings. FIG. 1 shows a system configuration of a fuel cell system 10 according to an embodiment of the present invention.

The fuel cell system 10 serves as an in-vehicle power source system that is installed in a fuel cell vehicle and includes: a fuel cell stack 20 which receives supply of reactant gases (a fuel gas and an oxidant gas) and generates electric power; an oxidant gas supply system 30 for supplying the air serving as the oxidant gas to the fuel cell stack 20; a fuel gas supply system 40 for supplying a hydrogen gas serving as the fuel gas to the fuel cell stack 20; a power system 50 for controlling charge and discharge of electric power; and a controller 60 which controls the entire system.

The fuel cell stack 20 is a solid polymer electrolyte-type cell stack in which a plurality of cells are stacked in series. In the fuel cell stack 20, the oxidation reaction in formula (1) occurs in an anode and the reduction reaction in formula (2) occurs in a cathode. The electrogenic reaction in formula (3) occurs in the fuel cell stack 20 as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The fuel cell stack 20 is provided with: a voltage sensor 71 for detecting an output voltage of the fuel cell stack 20 (FC voltage); and a current sensor 72 for detecting an output current of the fuel cell stack 20 (FC current).

The oxidant gas supply system 30 includes: an oxidant gas path 33 in which the oxidant gas to be supplied to the cathode in the fuel cell stack 20 flows; and an oxidant off-gas path 34 in which an oxidant off-gas discharged from the fuel cell stack 20 flows. The oxidant gas path 33 is provided with: an air compressor 32 which introduces the oxidant gas from the atmosphere via a filter 31; a humidifier 35 which humidifies the oxidant gas compressed by the air compressor 32; and a cutoff valve A1 for cutting off the supply of the oxidant gas to the fuel cell stack 20.

The oxidant off-gas path 34 is provided with: a cutoff valve A2 for cutting off the discharge of the oxidant off-gas from the fuel cell stack 20; a backpressure regulating valve A3 for regulating the supply pressure of the oxidant gas; and a humidifier 35 for exchanging moisture between the oxidant gas (dry gas) and the oxidant off-gas (wet gas).

The fuel gas supply system 40 includes: a fuel gas supply source 41; a fuel gas path 43 in which the fuel gas to be supplied from the fuel gas supply source 41 to the anode in the fuel cell stack 20 flows; a circulation path 44 for returning the fuel off-gas discharged from the fuel cell stack 20 to the fuel gas path 43; a circulation pump 45 which pumps the fuel off-gas in the circulation path 44 to send it to the fuel gas path 43; and an exhaust/drain path 46 which branches from the circulation path 44.

The fuel gas supply source 41 is constituted from, for example, a high-pressure hydrogen tank, a hydrogen absorbing alloy or similar and stores a hydrogen gas at a high pressure (e.g., 35 MPa to 70 MPa). When opening a cutoff valve H1, the fuel gas flows from the fuel gas supply source 41 toward the fuel gas path 43. The pressure of the fuel gas is reduced to, for example, about 200 kPa by, for example, a regulator H2 and an injector 42, and then the fuel gas is supplied to the fuel cell stack 20.

The circulation path 44 is connected to a cutoff valve H4 for cutting off the discharge of the fuel off-gas from the fuel cell stack 20 and the exhaust/drain path 46 branching from the circulation path 44. The exhaust/drain path 46 is provided with an exhaust/drain valve H5. The exhaust/drain valve H5 is actuated by a command from the controller 60 so as to discharge water, as well as the fuel off-gas containing impurities within the circulation path 44, toward the outside.

The fuel off-gas discharged from the exhaust/drain valve H5 is mixed with the oxidant off-gas flowing through the oxidant off-gas path 34 and diluted by a diluter (not shown). The circulation pump 45 is driven by a motor so as to circulate the fuel off-gas within the circulation system and supply it to the fuel cell stack 20.

The power system 50 includes a DC/DC converter 51, a battery (electric power storage device) 52, a traction inverter 53, a traction motor 54 and auxiliary apparatuses 55. The DC/DC converter 51 has: a function of increasing a direct-current voltage supplied from the battery 52 and outputting the resulting voltage to the traction inverter 53; and a function of decreasing the voltage of direct-current power generated by the fuel cell stack 20 or the voltage of regenerative power collected by the traction motor 54 as a result of regenerative braking, in order to charge the battery 52 with the resulting power.

The battery 52 functions as: a storage source for excess electric power; a storage source for regenerative energy during a regenerative braking operation; or an energy buffer provided for a load change resulting from acceleration or deceleration of a fuel cell vehicle. Suitable examples of the battery 52 may include a secondary cell, such as a nickel-cadmium battery, a nickel-hydrogen battery and a lithium battery. An SOC (State of Charge) sensor is attached to the battery 52 to detect the state of charge, being the remaining power, of the battery 52.

The traction inverter 53 may be, for example, a PWM inverter driven by pulse width modulation and the traction inverter 53 converts a direct-current voltage output from the fuel cell stack 20 or the battery 52 to a three-phase alternating current voltage in accordance with a control command provided by the controller 60 and controls a rotation torque of the traction motor 54. The traction motor 54 may be, for example, a three-phase alternating current motor which constitutes a power source of the fuel cell vehicle.

The auxiliary apparatuses 55 collectively refer to motors provided in respective parts of the fuel cell system 10 (e.g., power sources for the pumps), inverters for driving these motors, various types of in-vehicle auxiliary apparatuses (e.g., an air compressor, injector, cooling-water circulation pump, radiator, etc.).

The controller 60 is a computer system which includes a CPU, a ROM, a RAM, input/output interfaces and the like, wherein the controller 60 controls components of the fuel cell system 10. For example, when receiving a start signal IG output from an ignition switch, the controller 60 starts the operation of the fuel cell system 10 and obtains electric power required from the entire system based on an accelerator opening degree signal ACC output from an acceleration sensor and a vehicle speed signal VC output from a vehicle speed sensor. The electric power required from the entire system is the sum of the amount of electric power for the vehicle travel and the amount of electric power for the auxiliary apparatuses.

The electric power for the auxiliary apparatuses includes electric power consumed by the in-vehicle auxiliary apparatuses (the humidifier, air compressor, hydrogen pump, cooling-water circulation pump, etc.), electric power consumed by apparatuses which are required for the travel of the vehicle (a transmission, wheel control apparatus, steering gear, suspension, etc.), electric power consumed by apparatuses provided inside the passenger compartment (an air conditioner, lighting equipment, audio system, etc.), and the like.

The controller 60 determines the distribution ratio of the electrical power output from the fuel cell stack 20 and the electric power output from the battery 52 and controls the oxidant gas supply system 30 and the fuel gas supply system 40 so that the amount of electric power generated by the fuel cell stack 20 matches with a target electric power. The controller 60 further controls the DC/DC converter 51 so as to regulate the output voltage of the fuel cell stack 20 and thereby control the operating point (the output voltage and the output current) of the fuel cell stack 20.

In the fuel cell stack 20, a hydrogen ion generated in the node 23 passes through the electrolyte membrane 22 and moves to the cathode 24 as expressed by Formula (1) above, and the hydrogen ion moved to the cathode 24 undergoes an electrochemical reaction with the oxygen in the oxidant gas supplied to the cathode 24, as expressed by Formula (2) above, so as to cause an oxygen reduction reaction. As a result, an oxide film will cover a surface of a platinum catalyst of a catalyst layer 24a to reduce an effective area, and power generation efficiency (output characteristics) will thereby be degraded.

In order to cope with such circumstances, the controller 60 performs refresh processing in which the controller 60 decreases the cell voltage to a reduction voltage (refresh voltage) at a predetermined timing and holds the reduction voltage for a predetermined time period (refresh time period) to thereby reduce the oxide film and remove it from the catalyst surface.

Figure 3:
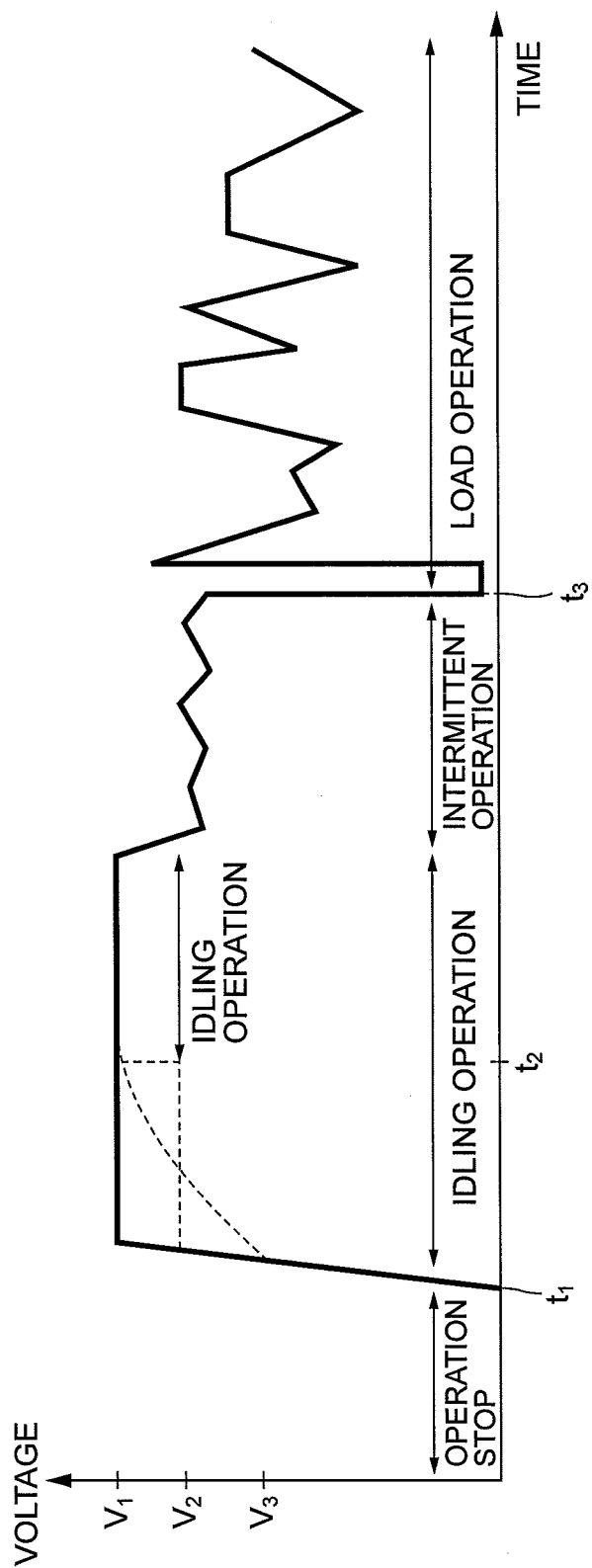
FIG. 3 is a timing chart showing an example of operation control of the fuel cell system.
Figure 5:
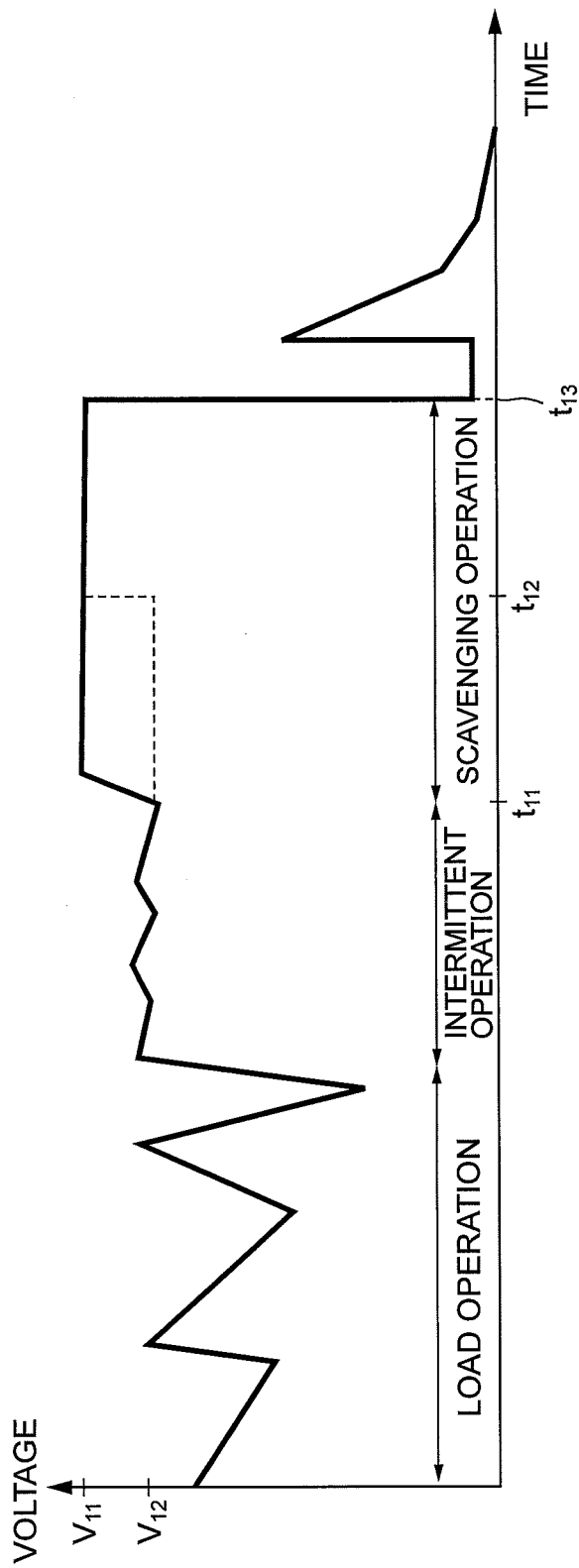
FIG. 5 is a timing chart showing another example of operation control of the fuel cell system.

More specifically, by decreasing the voltage of each cell, i.e., the output voltage of the fuel cell stack 20, and holding the decreased voltage for a predetermined time period as shown at timing t3 in FIG. 3 and timing t13 in FIG. 5, the output current is increased to cause the electrochemical reaction in the catalyst layer 24a to transfer from an oxidation reaction zone to a reduction reaction zone in order to restore the catalytic activity.

The refresh processing inevitably has to be performed in order to suppress the degradation of the power generation efficiency of the fuel cell 20. However, such processing controls the output voltage of the fuel cell 20 by setting the output voltage to a voltage that is much lower than it should be, even though temporarily. Accordingly, when the refresh processing is performed, the fuel cell 20 will generate more electric power than a necessary level (system-requested power) and power absorption (power charge) accordingly occurs at the battery 52.

However, since the capacity of the battery 52 to allow such power absorption is limited, the refresh processing should be limited so as to be performed only when it is necessary, in order to protect the battery 52 from overcharge.

Accordingly, it is necessary to improve the accuracy of estimating the amount of oxide film in order to judge the necessity of the refresh processing more accurately.

Figure 7:
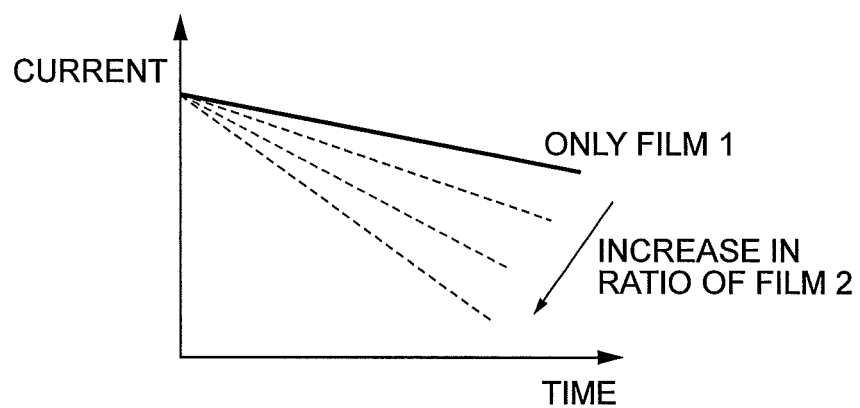
FIG. 7 is a diagram showing a relationship between an output current of the fuel cell stack and the content ratio of a type-II oxide film in an oxide film.

The amount of oxide film can be estimated by, for example, referring to the map shown in FIG. 7. The map in FIG. 7 shows the relationship among the time elapsed from the previous refresh processing (horizontal axis), a power generation current of the fuel cell stack 20 (vertical axis) and the total amount of the oxide films and the breakdown thereof (solid line and broken line in FIG. 7). This map has been created based on the results of experiments and simulations and stored in a memory in the controller 60.

It is obvious form FIG. 7 that: the power generation current of the fuel cell stack 20 decreases as time passes from the previous refresh processing; and the decreasing rate of the power generation current of the fuel cell stack 20 relative to the elapsed time from the previous refreshing time, i.e., the influence on the degradation of the performance of the catalyst layer 24a, increases in accordance with the increase in the amount of a type-II oxide film (denoted as "film 2" in FIG. 7) in the entire oxide film.

This further indicates that: an oxide film including the type-II oxide film would have a greater influence on the performance degradation of the catalyst layer 24a as compared to an oxide film consisting only of a type-I oxide film (denoted as "film 1" in FIG. 7); and if the oxide film includes the type-II oxide film, the higher the content ratio of the type-II oxide film is, the greater its influence will be on the performance degradation of the catalyst layer 24*a*.

Figure 8:
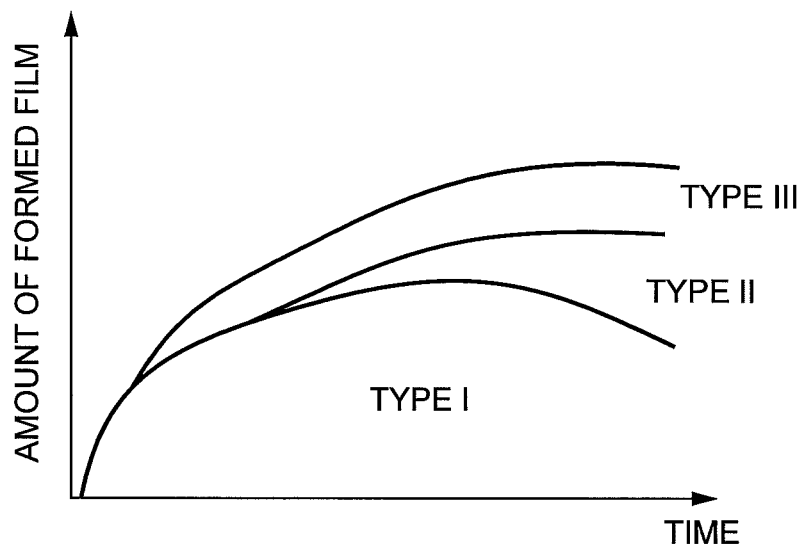
FIG. 8 is a diagram showing how the content ratios of a type-I oxide film, a type-II oxide film and a type-III oxide film in the oxide film formed on the catalyst layer each vary over time when an output voltage of the fuel cell stack is held at a constant value.

The type-I oxide film, type-II oxide film and type-III oxide film will now be further described. These oxide films may be present in a mixed state in a single oxide film. If the output voltage of the fuel cell stack 20 is held at a constant oxide film formation voltage (oxidation voltage), the content ratios thereof in the oxide film gradually vary as the holding time passes, as shown in FIG. 8, and the magnitudes of reduction voltages of the respective oxide films satisfy the following relationship:

Type-I oxide film (e.g., 0.65-0.9 V)>Type-II oxide film (e.g., 0.4-0.6 V)>Type-III oxide film (e.g., 0.05-0.4 V).

Figure 9:
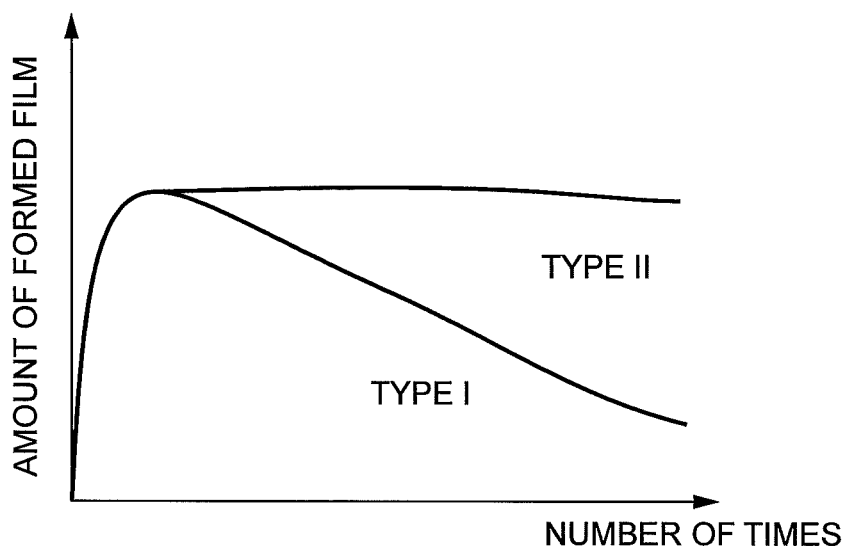
FIG. 9 is a diagram showing how the content ratios of the type-I oxide film and type-II oxide film in the oxide film formed on the catalyst layer each vary in accordance with an increase in the number of times the output voltage of the fuel cell stack crosses a predetermined boundary voltage during its increase and decrease.

In addition, the respective content ratios of the type-I oxide film, type-II oxide film and type-III oxide film in the whole oxide film gradually vary in accordance with the increase in the number of times the output voltage of the fuel cell stack 20 crosses a boundary voltage (e.g., 0.8 V) during its increase and decrease (hereinafter referred to as the "number of cycles"), as shown in FIG. 9 (the type-III oxide film is not shown therein).

As described above, since there may be two or more stages of reduction voltage that are capable of removing the oxide film, if the refresh voltage during the refresh processing is only decreased to a first reduction voltage that is capable of only removing the type-I oxide film, the type-II oxide film and type-III oxide film might be left without being successfully removed and the accuracy of estimating the amount of oxide film at the next time may be lowered in such case. Therefore, the settings of the refresh voltages for performing the refresh processing affect the accuracy of estimating the amount of oxide film.

Figure 2:
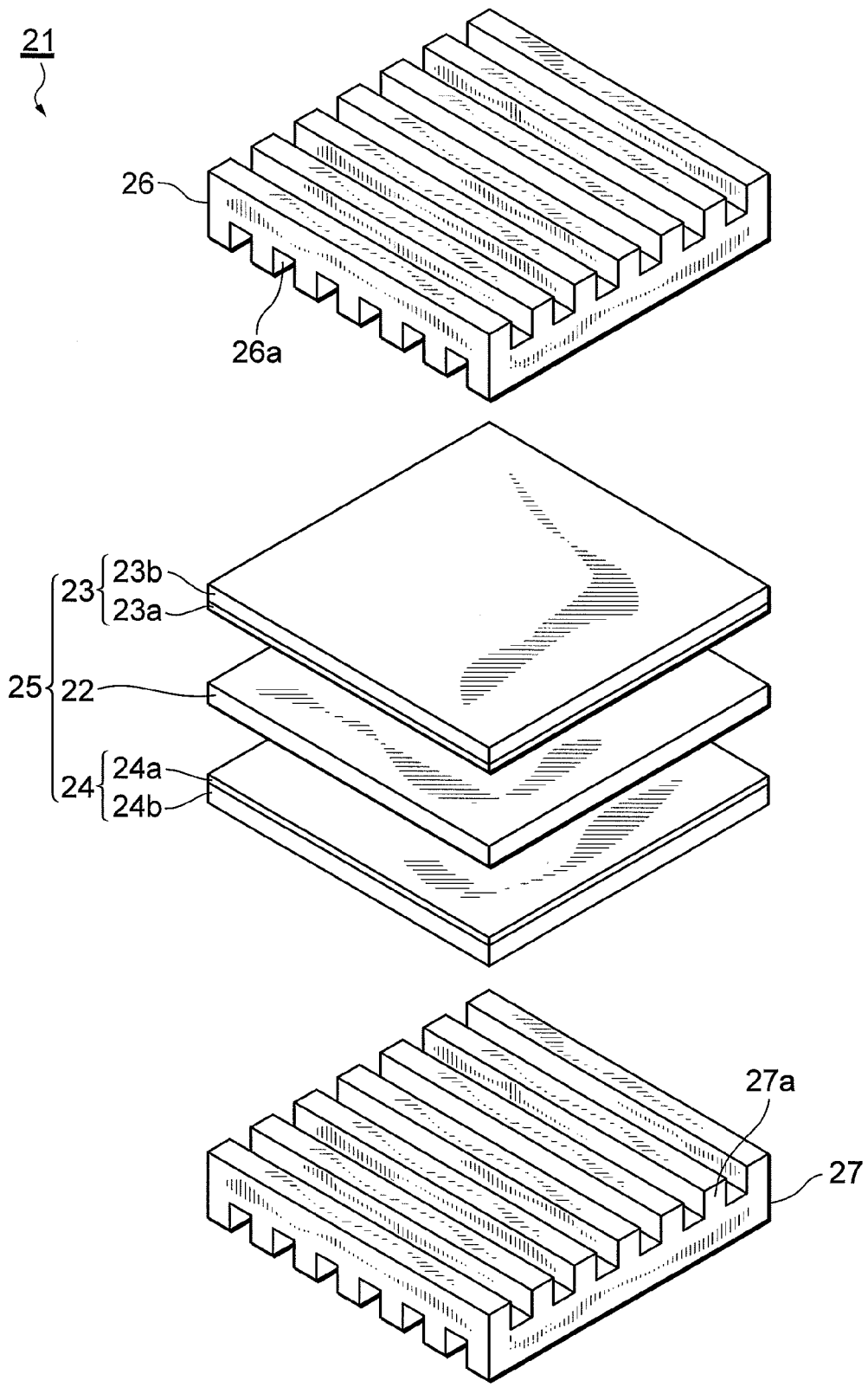
FIG. 2 is an exploded perspective view showing a cell constituting a fuel cell stack.

FIG. 2 is an exploded perspective view showing a cell 21 constituting the fuel cell stack 20. The cell 21 includes a polymer electrolyte membrane 22, an anode 23, a cathode 24 and separators 26 and 27. The anode 23 and the cathode 24 are diffusion electrodes having a sandwich structure in which such electrodes sandwich the polymer electrolyte membrane 22 from both sides thereof.

The separators 26 and 27 are made of a gas impermeable conductive member and they further sandwich the above sandwich structure from both sides thereof and form a fuel gas flow path and an oxidant flow path between the separators and the anode 23 and cathode 24, respectively. The separator 26 is provided with ribs 26*a* having a recessed shape in cross section.

By allowing the ribs 26*a* to abut onto the anode 23, the openings of the ribs 26*a* are closed so as to form the fuel gas flow path. The separator 27 is provided with ribs 27*a* having a recessed shape in cross section. By allowing the ribs 27*a* to abut onto the cathode 24, the openings of the ribs 27*a* are closed so as to form the oxidant gas flow path.

The anode 23 includes: a catalyst layer 23*a* which contains, as a main ingredient, carbon powder that supports a platinum-based metal catalyst (Pt, Pt—Fe, Pt—Cr, Pt—Ni, Pt—Ru, etc.) and contacts with the polymer electrolyte membrane 22; and a gas diffusion layer 23*b* formed on a surface of the catalyst layer 23*a* and having both permeability and electronic conductivity. The cathode 24 also includes a catalyst layer 24*a* and a gas diffusion layer 24*b* in the same way.

More specifically, the catalyst layers 23*a* and 24*a* are formed by dispersing the carbon powder, which is supporting platinum or an alloy consisting of platinum and other metal(s), into a suitable organic solvent, adding thereto an appropriate quantity of an electrolyte solution to turn it into a paste, and screen-printing the paste onto the polymer electrolyte membrane 22. The gas diffusion layers 23*b* and 24*b* may be formed of carbon cloth, carbon paper or carbon felt which is woven by carbon fiber yarn.

The polymer electrolyte membrane 22 is a proton-conducting ion-exchange membrane made of a solid polymer material (e.g., fluorinated resin) and such polymer electrolyte membrane 22 exhibits a preferable electrical conductivity in wet conditions. The polymer electrolyte membrane 22, the anode 23, and the cathode 24 form a membrane-electrode assembly 25.

FIG. 3 is a timing chart showing an example of operation control of the fuel cell system 10.

The fuel cell system 10 is configured so as to improve its power generation efficiency by switching the operation modes of the fuel cell stack 20 in accordance with the operation load.

For example, in a high load zone with a high power generation efficiency (an operation zone where the amount of power requested to be generated is equal to or higher than a predetermined value), the fuel cell system 10 performs a load operation in which the operation is controlled by calculating a power generation command value for the fuel cell stack 20 based on the opening degree of an accelerator and the vehicle speed, and electric power required for travel of the vehicle and electric power required for operation of the system are covered only by electric power generated by the fuel cell stack 20 or by electric power generated by the fuel cell stack 20 and electric power supplied from the battery 52.

On the other hand, in a low load zone with a low power generation efficiency (an operation zone, satisfying the condition of performing an intermittent operation, where the amount of power requested to be generated is less than the predetermined value), the fuel cell system 10 performs an intermittent operation in which the operation is controlled by setting the power generation command value for the fuel cell stack 20 to zero, and the electric power required for travel of the vehicle and the electric power required for operation of the system are covered by the electric power supplied from the battery 52. It should be noted that the cell voltage is held relatively high during the intermittent operation. This is because, if the cell voltage is low when a high load request (output increase request) is received during the intermittent operation, there will be a degradation in drivability.

When the vehicle is stopped, for example, immediately after the vehicle is started or while the vehicle is stopping at a red light, in other words, when the shift lever is in the P-range or N-range, or when the brake pedal is pressed and the vehicle speed is zero even though the shift lever is in the D-range, the fuel cell system 10 performs an idling operation in which it operates the fuel cell stack 20 to generate electric power at a power generation voltage required for ensuring drivability while charging the battery 52 with the generated power.

During an operation status where the cathode 24 is held at a high voltage, e.g., during the above-mentioned idling operation or during a scavenging operation (to be described later), there is a possibility that the platinum catalyst of the catalyst layer 24*a* in fuel cell stack 20 may be dissolved.

To cope with such issue, in the present embodiment, the fuel cell system 20 is configured to perform oxide film formation processing so as to actively form an oxide film on a surface of the catalyst layer 24*a* under a certain condition, in order to suppress the dissolution of the platinum catalyst which may occur during the idling operation. It should be noted that oxide film formation processing for suppressing the platinum catalyst dissolution which may occur during the scavenging operation will be separately described later.

<At the Start of Operation of the Fuel Cell System>

Figure 4:
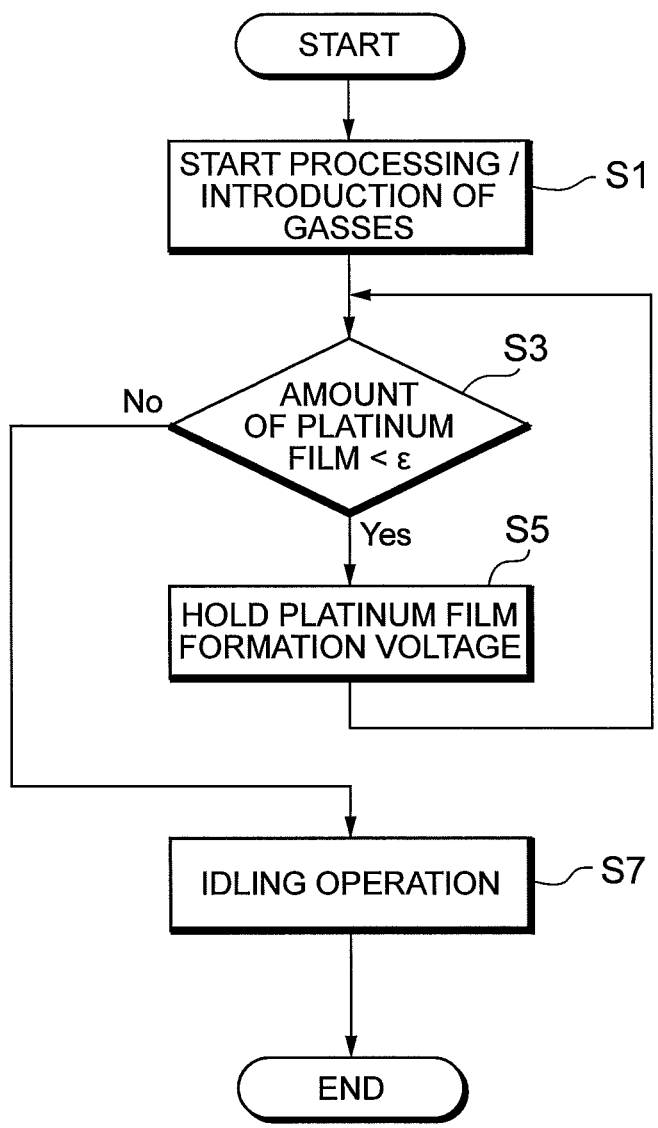
FIG. 4 is a flowchart showing a procedure for performing oxide film formation processing at the start of operation of the fuel cell system.

FIG. 4 is a flowchart showing a procedure for performing the oxide film formation processing at the start of operation of the fuel cell system 10. The following description will describe this flowchart with reference to FIG. 3, as needed.

Upon receipt of an ignition signal IGON output by the ignition switch while the operation is stopped, the controller 60 starts a predetermined starting operation for starting the fuel cell system 10 and starts the supply of oxidant gas and fuel gas to the fuel cell 20 (step S1; timing t1 in FIG. 3).

The idling operation causes the fuel cell stack 20 to generate electric power at a constant voltage, as shown in FIG. 3, and the power generation voltage during such operation is a voltage V1, being equal to or higher than a catalyst dissolution voltage where the platinum catalyst of the catalyst layer 24a is dissolved, and may therefore cause catalyst dissolution during the idling operation.

However, if a predetermined amount ϵ or greater oxide film is formed on the catalyst layer 24a, such oxide film can function as a protective layer and suppress the catalyst dissolution during the idling operation.

Before shifting the operation status of the fuel cell system 10 to the idling operation, the controller 60 judges whether or not the amount of oxide film formed on the surface of the platinum catalyst of the catalyst layer 24a is less than the predetermined amount ϵ (step S3). The amount of oxide film is estimated by, for example, referring to the map shown in FIG. 7. The predetermined amount ϵ can be obtained in advance based on the results of experiments and simulations and stored in a memory in the controller 60.

If the judgment result in step S3 is "Yes," i.e., if the amount of the oxide film formed on the surface of the platinum catalyst of the catalyst layer 24a is less than the predetermined amount ϵ, the controller determines that the catalyst dissolution during the idling operation cannot be suppressed and controls the output of the fuel cell 20 so that the power generation voltage of the fuel cell 20 is shifted to a voltage V2 (V2<V1) that can allow the oxide film to be formed on the surface of the catalyst layer 24a, and then the process returns to step S3. In other words, the shift to the idling operation (step S7) is prevented.

If the judgment result in step S3 is "No," i.e., if the amount of the oxide film formed on the surface of the platinum catalyst of the catalyst layer 24a is equal to or greater than the predetermined amount ϵ, the controller determines that the catalyst dissolution during the idling operation can be suppressed and controls the output of the fuel cell 20 so that the power generation voltage of the fuel cell 20 becomes the voltage V1 and shifts the operation status of the fuel cell system 10 to the idling operation (step S7).

In short, in the present embodiment, if the judgment result in step S3 following step S1 is "No," the target voltage of the fuel cell 20 is set to the voltage V1 and the operation status is immediately shifted to the idling operation (step S7) (see the solid line in FIG. 3), while if the judgment result in step S3 following step S1 is "Yes," the shift to the idling operation is prevented until the judgment result in step S3 becomes "No" (during a time period from t1 to t2 in FIG. 3) and the state in which the target voltage of the fuel cell 20 is held at the voltage V2 is continued (see the broken line in FIG. 3).

As described above, if there is a risk of catalyst dissolution occurring at the start of the idling operation, the oxide film formation processing for actively forming the oxide film on the catalyst layer 24a is performed to thereby resolve the risk of catalyst dissolution and then the idling operation is started in the present embodiment. Thus, it is possible to suppress the degradation of the output performance that would otherwise be caused by the catalyst dissolution.

In the present embodiment, the necessity of the oxide film formation processing is not judged based on whether or not the target voltage of the fuel cell 20 is equal to or higher than the catalyst dissolution voltage that would cause the catalyst dissolution, but rather is judged based on whether or not the amount of oxide film formed on the surface of the platinum catalyst of the catalyst layer 24a is less than the predetermined amount ϵ. Thus, if the amount of oxide film is equal to or greater than the predetermined amount ϵ and it is thus determined that the catalyst dissolution can be suppressed even if the target voltage of the fuel cell 20 is set to the catalyst dissolution voltage or higher, it is possible to avoid unnecessary oxide film formation processing from being performed and to thereby suppress the degradation of fuel efficiency.

Furthermore, since the amount of oxide film is estimated on the presumption that the oxide film may at least contain the type-I oxide film and type-II oxide film in the present embodiment, the reliability of the judgment result in step S3 can be improved and unnecessary oxide film formation processing can more reliably be avoided from being performed.

It should be noted that, although the oxide film formation processing in the present embodiment has been described such that, if the judgment result in step S3 following step S1 is "Yes," the power generation voltage of the fuel cell 20 is held at the voltage V2 until the judgment result in step S3 becomes "No," the oxide film formation processing before the start of the idling operation is not limited to such example.

For example, the oxide film formation processing may be configured such that the power generation voltage of the fuel cell 20 is gradually increased from a predetermined voltage V3 (V3<V2) that allows the formation of the oxide film to the voltage V1 as shown in the dashed line in FIG. 3, i.e., a voltage increase speed may be lowered. In such process, it is clearly possible to configure the power generation voltage of the fuel cell 20 so that it is gradually increased so as to form a concave curved line or a linear line, instead of a convex curved line as shown in FIG. 3.

<At the End of Operation of the Fuel Cell System>

FIG. 5 is a flowchart showing a procedure for performing oxide film formation processing at the start of the scavenging operation which is performed before the end of operation of the fuel cell system. This flowchart will be described with reference to FIG. 6, as needed.

Upon receipt of an operation stop signal IGOFF output by the ignition switch during, for example, the intermittent operation, the controller 60 starts predetermined termination processing for terminating the operation of the fuel cell system 10 and scavenging operation (step S11; timing t11 in FIG. 5).

It should be noted that the scavenging operation refers to drying processing that is performed at the end of operation of the fuel cell 20 for the purpose of discharging the water trapped inside the fuel cell 20 and drying the fuel cell 20, and the scavenging operation is performed by supplying the oxidant gas to the fuel cell in, for example, a state in which the supply of the fuel gas to the fuel cell 20 is stopped, and then discharging the water inside the fuel cell 20 toward the outside via the oxidant off-gas path 34.

Next, the controller 60 judges whether or not the amount of oxide film formed on the surface of the platinum catalyst of the catalyst layer 24a is less than the predetermined amount ϵ (step S13). Since the content of the processing performed in step S13 is the same as that of the above-mentioned processing performed in step S3 in FIG. 4, the description thereof will be omitted.

The scavenging operation causes the fuel cell stack 20 to generate electric power at a constant voltage as shown in FIG. 5, and the power generation voltage during such operation (corresponding to a normal voltage in step S17 to be described later) is a voltage V11, being equal to or higher than a catalyst dissolution voltage where the platinum catalyst of the catalyst layer 24a is dissolved, and may therefore cause the catalyst dissolution during the scavenging operation. However, if a predetermined amount ϵ or greater oxide film is formed on the catalyst layer 24a, such oxide film can function as a protective layer, as described earlier, and suppress the catalyst dissolution during the scavenging operation.

If the judgment result in step S13 is "Yes," i.e., if the amount of the oxide film formed on the surface of the platinum catalyst of the catalyst layer 24a is less than the predetermined amount ϵ, the controller 60 determines that the catalyst dissolution during the scavenging operation cannot be suppressed and controls the output of the fuel cell 20 so that the power generation voltage of the fuel cell 20 is shifted to a voltage V2 (V2<V11) that can allow the oxide film to be formed on the surface of the catalyst layer 24a, and then the process returns to step S13. In other words, the scavenging operation is prevented from being performed at the voltage V11 (normal voltage) that is normally used in the scavenging operation (step S17).

If the judgment result in step S13 is "No," i.e., if the amount of the oxide film formed on the surface of the platinum catalyst of the catalyst layer 24a is equal to or greater than the predetermined amount ϵ, the controller 60 determines that the catalyst dissolution can be suppressed even during the scavenging operation at the voltage V11 (normal voltage) and controls the output of the fuel cell 20 so that the power generation voltage of the fuel cell 20 becomes the voltage V11 and performs the scavenging operation at the normal voltage (step S17).

In short, in the present embodiment, if the judgment result in step S13 following step S11 is "No," the scavenging operation is performed with the target voltage of the fuel cell 20 being set to the voltage V11 that is normally used for the scavenging operation (step S17) (see the solid line in FIG. 5), while if the judgment result in step S13 following step S11 is "Yes," the state in which the target voltage for the scavenging operation is held at the voltage V12 (see the broken line in FIG. 5) is continued until the judgment result in step S13 becomes "No" (during a time period from t11 to t12 in FIG. 5).

As described above, if there is a risk of catalyst dissolution occurring at the start of the scavenging operation, the oxide film formation processing for actively forming the oxide film on the catalyst layer 24a is performed while concurrently performing the scavenging operation at the voltage V12 that is lower than the normally-used voltage V11, to thereby resolve the risk of catalyst dissolution, and then the scavenging operation at the normally-used voltage V11 is performed in the present embodiment. Thus, it is possible to suppress the degradation of the output performance that would otherwise be caused by the catalyst dissolution.

In the present embodiment, the necessity of the oxide film formation processing during the scavenging operation is not judged based on whether or not the target voltage of the fuel cell 20 is equal to or higher than the catalyst dissolution voltage that may cause the catalyst dissolution, but rather is judged based on whether or not the amount of oxide film formed on the surface of the platinum catalyst of the catalyst layer 24a is less than the predetermined amount ϵ. Thus, if the amount of oxide film is equal to or greater than the predetermined amount ϵ and it is therefore determined that the catalyst dissolution can be suppressed even if the target voltage of the fuel cell 20 during the scavenging operation is set to the catalyst dissolution voltage or higher, it is possible to avoid unnecessary oxide film formation processing from being performed and thereby shorten the time required for the scavenging operation.

Furthermore, since the amount of oxide film is estimated on the presumption that the oxide film may at least contain the type-I oxide film and type-II oxide film in the present embodiment, the reliability of the judgment result in step S13 can be improved and unnecessary oxide film formation processing can more reliably be avoided from being performed.

It should be noted that, although the oxide film formation processing in the present embodiment has been described such that, if the judgment result in step S13 following step S11 is "Yes," the power generation voltage of the fuel cell 20 is held at the voltage V12 until the judgment result in step S13 becomes "No," the oxide film formation processing at the start of the scavenging operation is not limited to such example.

For example, the power generation voltage of the fuel cell 20 may be gradually increased from a voltage at the end of the intermittent operation (being a voltage that is lower than the voltage V11 and that allows the formation of the oxide film) to the voltage V1. In other words, the speed of the voltage increase may be lowered. In such process, it is obviously possible to configure the power generation voltage of the fuel cell 20 so as to be gradually increased such that it forms a convex curved line, a concave curved line or a linear line.

Figure 6:
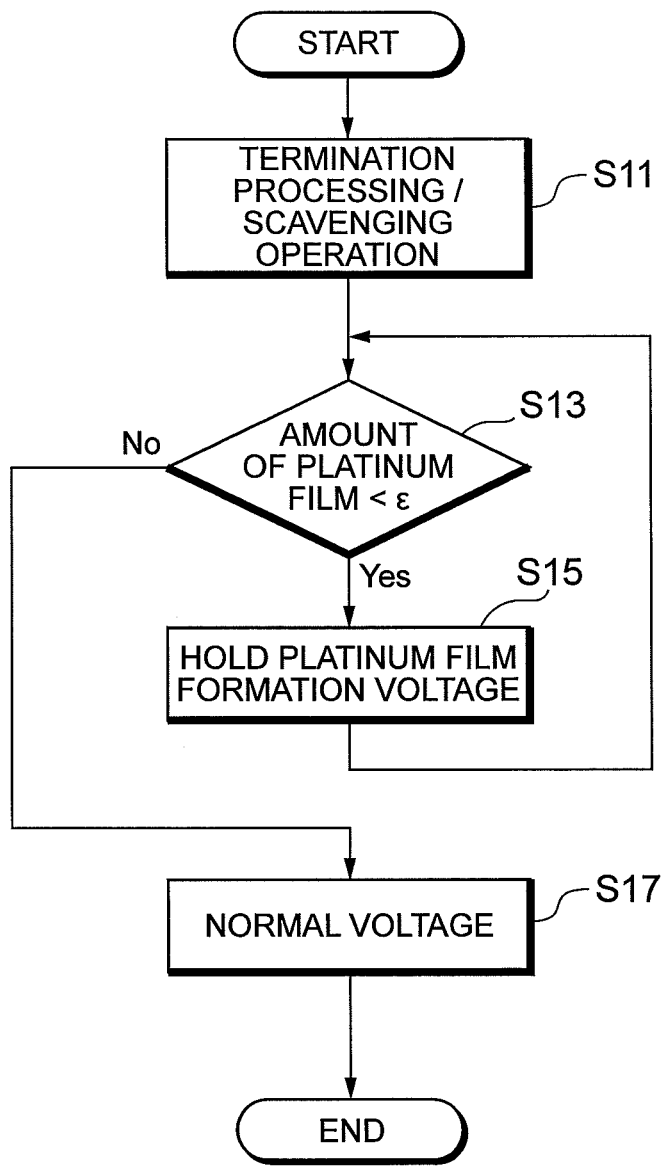
FIG. 6 is a flowchart showing a procedure for performing oxide film formation processing at the end of operation of the fuel cell system.

In addition, in the processing performed in step S3 in FIG. 4 and step S13 in FIG. 6, the following examples of methods for estimating the amount of oxide film may be employed:

(1) The amount of oxide film is estimated based on the change over time in an output current while the fuel cell 20 is being operated at a constant voltage (corresponding to the tilts of the linear line and the broken line in FIG. 7). In this case, a map indicating the relationship between the change over time in the output current (tilt) and the amount of oxide film, for each voltage which is set as a constant value during the constant voltage operation, may be prepared in, for example, the controller 60.

(2) The amount of oxide film is estimated based on a duration for which the fuel cell 20 is operated at a constant voltage (see FIG. 8). In this case, a map as shown in FIG. 8 may be prepared in, for example, the controller 60, for each voltage which is set as a constant value during the constant voltage operation.

(3) The amount of oxide film is estimated by counting, by the controller 60, the number of times that the output voltage of the fuel cell 20 crosses a predetermined boundary voltage (the number of cycles) during its increase and decrease and then the estimate is made based on such number of times (see FIG. 9).

Figure 10:
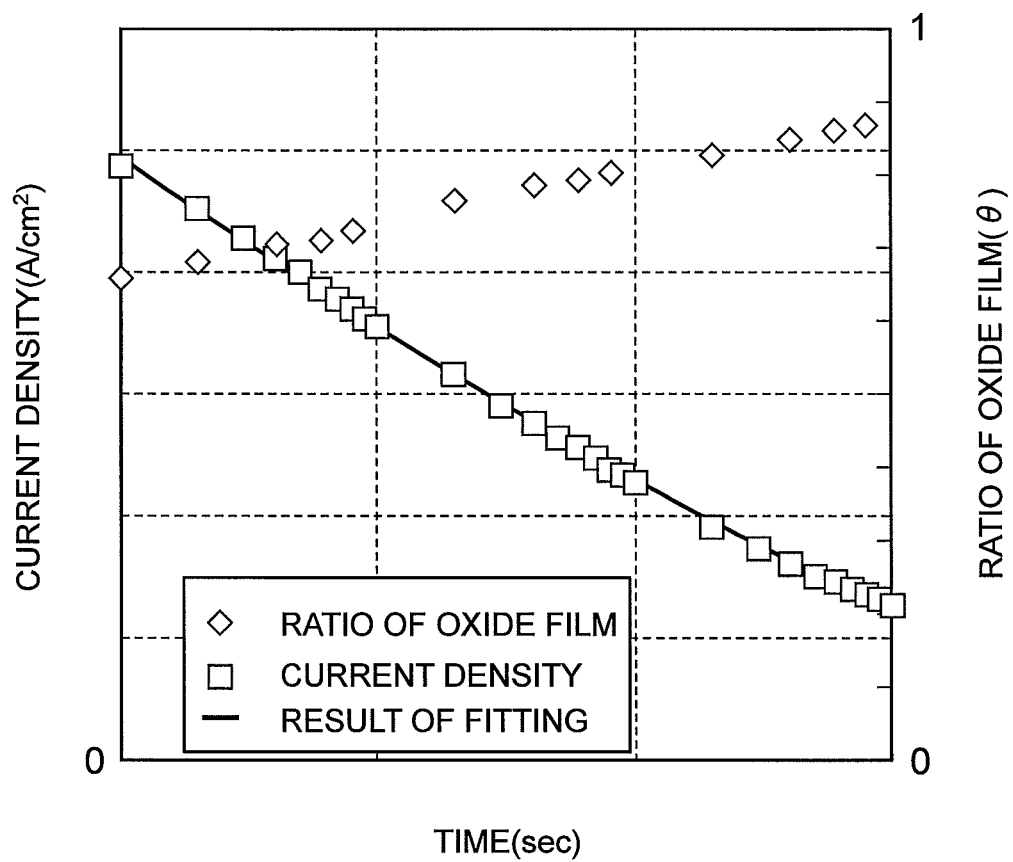
FIG. 10 is a diagram showing an example of a relationship between an output current (current density) and an oxide film ratio (amount of oxide film) when the output voltage of the fuel cell stack is held at a constant value.

(4) The amount of oxide film is estimated based on: a theoretical equation obtained by adding the concept of the oxide film ratio to the Butler-Vollmer equation (see Equation 1) with the experimental results as shown in, for example, FIG. 10 being fitted thereinto; and the output current (current density) of the fuel cell 20. It should be noted that, although the constant n in a case in which the oxide film contains only the type-I oxide film is n≈1, the constant n becomes n>1 as the ratio of the type-II oxide film increases and the constant n becomes larger in accordance with the increase in such ratio.

$$i = i_0(1 - n\theta)^m \exp\left(-\frac{\beta F}{RT}\eta\right)$$ [Equation 1]

i: current density
$i_0$: exchange current density
n: constant (fitted)
θ: oxide film ratio
m: constant (fitted)
β: constant (fixed)
F: Faraday constant
η: overvoltage
R: gas constant
T: Temperature In addition, although applications in which the fuel cell system 10 is used as an in-vehicle power system are described in each of the above-described embodiments, the applications of the fuel cell system 10 are not limited thereto. For example, the fuel cell system 10 may be installed as a power source for a movable body (e.g., a robot, a ship, an airplane, etc.) other than a fuel cell vehicle. In addition, the fuel cell system 10 according to the above embodiments may be used as a power generating facility for houses, buildings, etc. (stationary power generating systems).

What is claimed is:

1. A fuel cell system comprising:
   a fuel cell including a membrane-electrode assembly in which electrodes, each having a catalyst layer, are arranged on both surfaces of a polymer electrolyte membrane; and
   a control apparatus programmed to control an output voltage of the fuel cell;
   wherein, if a target voltage of the fuel cell is set so as to be equal to or higher than a catalyst dissolution voltage at which a catalyst in the catalyst layer is dissolved and an amount of an oxide film formed on the catalyst layer is estimated to be less than a first predetermined amount, the control apparatus programmed to control the output voltage of the fuel cell so as to be equal to an oxide film formation voltage, being lower than the catalyst dissolution voltage, until the amount of the oxide film is estimated to be equal to or greater than the first predetermined amount, and then programmed to control the output voltage so as to be equal to the target voltage.

2. The fuel cell system according to claim 1, wherein, while the control apparatus is programmed to control the output voltage of the fuel cell so as to be equal to the oxide film formation voltage, being lower than the catalyst dissolution voltage, until the amount of the oxide film is estimated to be equal to or greater than the first predetermined amount, the control apparatus programmed to control the output voltage of the fuel cell such that the oxide film formation voltage is held at a constant voltage.

3. The fuel cell system according to claim 1, wherein, while the control apparatus is programmed to control the output voltage of the fuel cell so as to be equal to the oxide film formation voltage, being lower than the catalyst dissolution voltage, until the amount of the oxide film is estimated to be equal to or greater than the first predetermined amount, the control apparatus programmed to control the output voltage of the fuel cell so that the oxide film formation voltage increases gradually.

4. The fuel cell system according to claim 1, wherein, if the target voltage of the fuel cell is set so as to be equal to or higher than the catalyst dissolution voltage at which the catalyst in the catalyst layer is dissolved and the amount of the oxide film formed on the catalyst layer is estimated to be less than the first predetermined amount at a start of operation of the fuel cell, the control apparatus programmed to control the output voltage of the fuel cell so as to be equal to the oxide film formation voltage, being lower than the catalyst dissolution voltage, until the amount of the oxide film is estimated to be equal to or greater than the first predetermined amount, and then programmed to control the output voltage so as to be equal to the target voltage.

5. The fuel cell system according to claim 1, wherein, if the target voltage of the fuel cell is set so as to be equal to or higher than the catalyst dissolution voltage at which the catalyst in the catalyst layer is dissolved and the amount of the oxide film formed on the catalyst layer is estimated to be less than the first predetermined amount at a start of a scavenging operation for scavenging an inside of the fuel cell, the control apparatus programmed to control the output voltage of the fuel cell so as to be equal to the oxide film formation voltage, being lower than the catalyst dissolution voltage, until the amount of the oxide film is estimated to be equal to or greater than the first predetermined amount, and then programmed to control the output voltage so as to be equal to the target voltage.

* * * * *